(12) United States Patent
Hirade et al.

(10) Patent No.: US 11,851,569 B2
(45) Date of Patent: Dec. 26, 2023

(54) INK, IMAGE FORMING METHOD, IMAGE FORMING APPARATUS, AND PRINTED MATTER

(71) Applicant: RICOH COMPANY, LTD., Tokyo (JP)

(72) Inventors: Tomohiro Hirade, Kanagawa (JP); Masaki Kudo, Kanagawa (JP); Mio Akima, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 254 days.

(21) Appl. No.: 17/209,609

(22) Filed: Mar. 23, 2021

(65) Prior Publication Data

US 2021/0301156 A1 Sep. 30, 2021

(30) Foreign Application Priority Data

Mar. 31, 2020 (JP) ................................ 2020-064003

(51) Int. Cl.
*C09D 11/037* (2014.01)
*C09D 11/033* (2014.01)
(Continued)

(52) U.S. Cl.
CPC ......... *C09D 11/037* (2013.01); *B41M 5/0023* (2013.01); *C08K 3/22* (2013.01);
(Continued)

(58) Field of Classification Search
CPC ..... C09D 11/037; C09D 11/033; C09D 11/38; C09D 11/322; C09D 11/52; C09D 11/101; C09D 11/30; C09D 7/61; C09D 5/36; C09D 11/03; C09D 7/70; B41M 5/0023; B41M 5/5218; B41M 5/52; B41M 3/14; C08K 3/22; C08K 3/36; C08K 2003/2237; C08K 2003/22372; B41J 2/1631; B41J 2/1642;
(Continued)

(56) References Cited

U.S. PATENT DOCUMENTS

2009/0025603 A1* 1/2009 Kuriyama ............... C09D 11/54
106/31.65
2015/0184010 A1 7/2015 Okada et al.
(Continued)

FOREIGN PATENT DOCUMENTS

JP 2008255241 A * 10/2008
JP 2012-097214 5/2012
(Continued)

OTHER PUBLICATIONS

English Machine Translation of JP-2017031354-A (Year: 2017).*
English Machine Translation of JP-2008255241-A (Year: 2008).*

*Primary Examiner* — Jennifer A Smith
*Assistant Examiner* — Jeffrey Eugene Barzach
(74) *Attorney, Agent, or Firm* — Grüneberg and Myers PLLC

(57) ABSTRACT

Provided is an ink including water, an organic solvent, resin particles, a first inorganic pigment, and a second inorganic pigment. The first inorganic pigment comprises particulate titanium oxide. The second inorganic pigment comprises at least one selected from the group consisting of acicular titanium oxide, fusiform titanium oxide, and silica particles.

11 Claims, 1 Drawing Sheet

(51) Int. Cl.
  *C08K 3/22* (2006.01)
  *C08K 3/36* (2006.01)
  *B41M 5/00* (2006.01)

(52) U.S. Cl.
  CPC .............. *C08K 3/36* (2013.01); *C09D 11/033* (2013.01); *C08K 2003/2237* (2013.01)

(58) Field of Classification Search
  CPC ...... B41J 2/1628; B41J 2/1639; B41J 2/1623; B41J 2/14427; B41J 2/01; B41J 2/1412; B41J 2/1404; B41J 2002/14491; C01P 2004/54; C01P 2004/61; C01P 2004/20; C01P 2004/64
  See application file for complete search history.

(56) References Cited

U.S. PATENT DOCUMENTS

| | | |
|---|---|---|
| 2017/0349772 A1 | 12/2017 | Hirade et al. |
| 2018/0265724 A1* | 9/2018 | Mizutaki .............. C09D 11/322 |
| 2019/0031897 A1 | 1/2019 | Hirade et al. |
| 2020/0023648 A1 | 1/2020 | Gotou et al. |
| 2020/0109301 A1* | 4/2020 | Mizutaki .............. C09D 11/324 |

FOREIGN PATENT DOCUMENTS

| | | |
|---|---|---|
| JP | 2014-185235 | 10/2014 |
| JP | 2015-124271 | 7/2015 |
| JP | 2017031354 A * | 2/2017 |
| JP | 2019-044069 | 3/2019 |

* cited by examiner

INK, IMAGE FORMING METHOD, IMAGE FORMING APPARATUS, AND PRINTED MATTER

CROSS-REFERENCE TO RELATED APPLICATIONS

This patent application is based on and claims priority pursuant to 35 U.S.C. § 119(a) to Japanese Patent Application No. 2020-064003, filed on Mar. 31, 2020, in the Japan Patent Office, the entire disclosure of which is hereby incorporated by reference herein.

BACKGROUND

Technical Field

The present disclosure relates to an ink, an image forming method, an image forming apparatus, a printed matter.

Description of the Related Art

Print media used when using inkjet printers for industrial applications are not limited to paper, and a wide variety of media ranging from transparent print media to colored print media are used. When displaying white or depositing color inks on these print media, there is a need to cover the transparency of the print media with the ink or sufficiently cover the color of the print media with the ink. For this reason, a white ink is used for whitening the transparent print media or colored print media. When color inks are used, in order for them to be equivalent to the quality of color inks used for typical images, print media are printed with a white ink as an underlying layer of the color inks to improve color development.

A widely used pigment for the white ink is titanium dioxide, which is a white pigment excellent in, for example, covering power and coloring power. For achieving high covering power using the titanium dioxide, particle diameters of the titanium dioxide need to range from 200 nm through 400 nm for scattering visible light. However, the titanium dioxide tends easily to settle because the specific gravity thereof is higher than that of an ink medium. Also, the settling velocity becomes higher in low-viscosity inks such as aqueous inks and solvent inks. Once settled, the titanium dioxide forms a close-packed structure, involving difficulty in re-dispersion.

SUMMARY

According to one aspect of the present disclosure, an ink includes water, an organic solvent, resin particles, a first inorganic pigment, and a second inorganic pigment. The first inorganic pigment comprises particulate titanium oxide. The second inorganic pigment comprises at least one selected from the group consisting of acicular titanium oxide, fusiform titanium oxide, and silica particles.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein.

Figure 1:
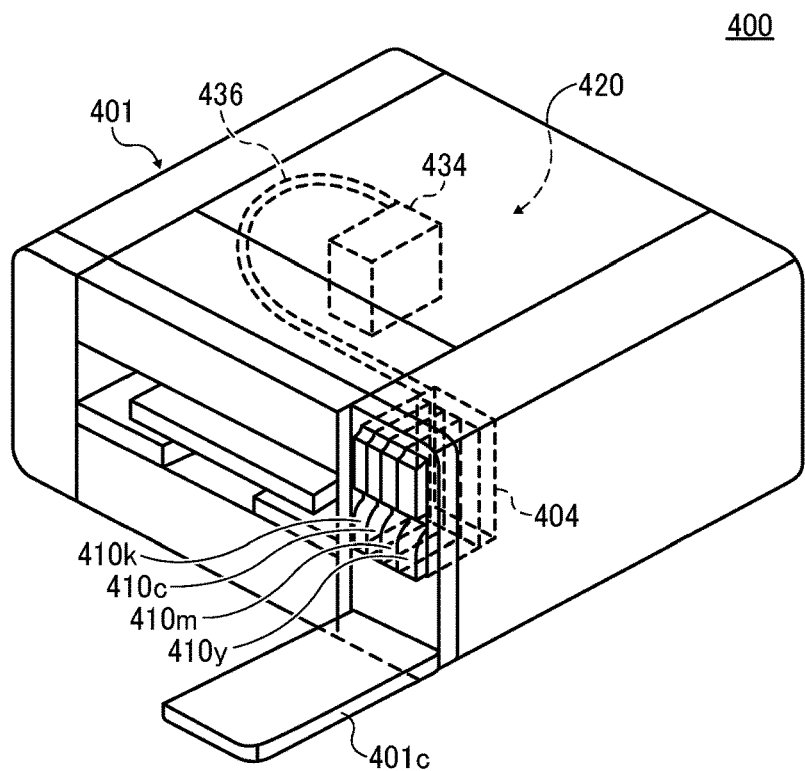
FIG. 1 is a perspective view illustrating an image forming apparatus according to an embodiment of the present invention.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

According to the present disclosure, it is possible to provide an ink including inorganic pigments that are easily re-dispersed even after settlement and having excellent storage stability and discharge stability.

(Ink)

The ink of the present disclosure includes water, an organic solvent, resin particles, a first inorganic pigment, and a second inorganic pigment. The first inorganic pigment comprises particulate titanium oxide. The second inorganic pigment comprises at least one selected from the group consisting of acicular titanium oxide, fusiform titanium oxide, and silica particles. If necessary, the ink further includes other components.

Existing techniques use saccharide and hydrophilic layered clay mineral for improving re-dispersibility of titanium dioxide, but have a problem that once settled, the titanium dioxide forms a close-packed structure, involving difficulty in re-dispersion.

The ink of the present disclosure includes the first inorganic pigment that is particulate titanium oxide and the second inorganic pigment that is at least one selected from the group consisting of acicular titanium oxide, fusiform titanium oxide, and silica particles. With this composition, even when particles of the particulate titanium oxide settle, the acicular titanium oxide, the fusiform titanium oxide, or the silica particles get in between the particles of the particulate titanium oxide. As a result, the particulate titanium oxide does not easily form a close-packed structure at the time of settlement. This makes it possible to suppress caking and achieve easy re-dispersion.

Accordingly, the present disclosure can provide an ink including inorganic pigments that are easily re-dispersed even after settlement and having excellent storage stability and discharge stability.

The ink of the present disclosure includes water, an organic solvent, resin particles, particulate titanium oxide as a first inorganic pigment, and as a second inorganic pigment, at least one selected from the group consisting of acicular titanium oxide, fusiform titanium oxide, and silica particles.

Whether an ink and a printed matter fall within the present disclosure is determined in the following manner. Specifically, the ink can be observed with an electron microscope to identify the shapes of the first and second inorganic pigments. Also, the ink can be subjected to elemental analysis using energy dispersive X-ray spectroscopy (EDX) to identify the kind of the second inorganic pigment. The organic solvent and the resin particles can be identified through analysis by, for example, GC-MS. Similarly, the printed matter can be observed for a cross section of the coated film to identify the shapes of the first and second inorganic pigments. The printed matter can be subjected to elemental analysis using EDX to identify the kind of the second inorganic pigment.

<First Inorganic Pigment>

The first inorganic pigment comprises particulate titanium oxide. In the present disclosure, the particulate titanium oxide refers to titanium oxide having an aspect ratio (average major axis length/average minor axis length) of lower than 5. Here, the aspect ratio is defined as a ratio of an average major axis length to an average minor axis length.

The aspect ratio of the particulate titanium oxide (average major axis length/average minor axis length) is preferably lower than 5, more preferably 1 or higher but 3 or lower.

The number average primary particle diameter of the particulate titanium oxide is not particularly limited and may be appropriately selected depending on the intended purpose. It is preferably 200 nm or more but 400 nm or less, more preferably 200 nm or more but 300 nm or less. When the number average primary particle diameter is 200 nm or more, whiteness can be ensured. When the number average primary particle diameter is 400 nm or less, discharge stability is excellent.

The number average primary particle diameter of the particulate titanium oxide is defined as a value determined in the following manner. Specifically, for example, a transmission electron microscope (device name: JEM-2100F, available from JEOL Ltd.) is used to measure unidirectional particle diameters of 200 or more but 500 or less primary particles in a field of view at a magnification of 30,000, with the primary particles held between two parallel unidirectional lines. Then, the numerical values falling within the top 5% and within the bottom 5% are excluded, and the numerical values falling within the remaining 90% are averaged. The obtained average value is defined as the number average primary particle diameter of the particulate titanium oxide.

The aspect ratio of the particulate titanium oxide is calculated similar to the measurement of the number average primary particle diameter. Specifically, a plurality of particles (200 particles) of the particulate titanium oxide are measured for major axis lengths and minor axis lengths through observation with an electron microscope. The major axis lengths are averaged to obtain an average major axis length, and the minor axis lengths are averaged to obtain an average minor axis length. The average major axis length is divided by the average minor axis length to calculate the aspect ratio.

A production method of the particulate titanium oxide described above is not particularly limited and may be appropriately selected depending on the intended purpose. Examples of the production method include, but are not limited to, the sulfuric acid method and the chlorine method. Surface treatment of the titanium oxide particles is not particularly limited, either. The surfaces of the particles are preferably treated with alumina in order to suppress high photocatalytic activity of the titanium oxide particles.

The particulate titanium oxide may be a commercially available product. Examples of the commercially available product include, but are not limited to: "JR-301", "JR-403", "JR-405", "JR-600A", "JR-605", "JR-600E", "JR-603", "JR-701", "JRNC", "JR-800", "JR-805", and "JR-806" all of which are available from TAYCA CORPORATION; and "CR-50", "CR-50-2", "CR-57", "CR-Super70", "CR-58", and "CR-58-2 all of which are available from ISHIHARA SANGYO KAISHA, LTD. One of these may be used alone or two or more of these may be used in combination.

<Second Inorganic Pigment>

The second inorganic pigment comprises acicular titanium oxide, fusiform titanium oxide, and/or silica particles.

The acicular titanium oxide in the present disclosure refers to titanium oxide having an aspect ratio (average major axis length/average minor axis length) of 10 or higher.

The fusiform titanium oxide in the present disclosure refers to titanium oxide having an aspect ratio (average major axis length/average minor axis length) of 5 or higher but lower than 10.

The acicular titanium oxide and the fusiform titanium oxide can be distinguished from each other based on the aspect ratios.

The aspect ratio (average major axis length/average minor axis length) of the fusiform titanium oxide is preferably 5 or higher but lower than 10.

The aspect ratio (average major axis length/average minor axis length) of the acicular titanium oxide is preferably 10 or higher.

The fusiform titanium oxide and the acicular titanium oxide having the aspect ratios falling within the above numerical ranges suppress formation of the close-packed structure of the particulate titanium oxide as the first inorganic pigment at the time of settlement. This prevents caking from easily occurring, leading to improvement in re-dispersibility. Moreover, it is possible to ensure excellent discharge stability.

The aspect ratios of the acicular titanium oxide and the fusiform titanium oxide can be calculated, for example, similar to the calculation of the aspect ratio of the particulate titanium oxide. Specifically, a plurality of particles (200 particles) of the acicular titanium oxide or the fusiform titanium oxide are measured for major axis lengths and minor axis lengths through observation with an electron microscope. The major axis lengths are averaged to obtain an average major axis length, and the minor axis lengths are averaged to obtain an average minor axis length. The average major axis length is divided by the average minor axis length to calculate the aspect ratio.

The acicular titanium oxide may be a commercially available product. Examples of the commercially available product include, but are not limited to, "ST-485SA15" available from Titan Kogyo, Ltd.

The fusiform titanium oxide may be a commercially available product. Examples of the commercially available product include, but are not limited to, "ST-457SA", "ST-455", "ST-450EC", "STV-455", and "ST-455WS" all of which are available from Titan Kogyo, Ltd.

The number average primary particle diameter of the silica particles is not particularly limited and may be appropriately selected depending on the intended purpose. It is preferably 20 nm or more but 100 nm or less. When the number average primary particle diameter of the silica particles is 20 nm or more, re-dispersibility improves. When the number average primary particle diameter is 100 nm or less, discharge stability can be ensured.

The silica particles may be a commercially available product. Examples of the commercially available product include, but are not limited to, "ST-S", "ST-30", "ST-50-T", "ST-30L", "ST-YL", "ST-ZL", and "MP-1040" all of which are available from Nissan Chemical Corporation. One of these may be used alone or two or more of these may be used in combination.

The total amount of the first inorganic pigment and the second inorganic pigment is preferably 5% by mass or more but 15% by mass or less, more preferably 6% by mass or more but 10% by mass or less, relative to the total amount of the ink. When the total amount of the inorganic pigments is 5% by mass or more, whiteness can be improved. When the total amount of the inorganic pigments is 15% by mass or less, discharge stability can be ensured.

The mass ratio (the first inorganic pigment/the second inorganic pigment) of the amount of the first inorganic pigment to the amount of the second inorganic pigment is preferably 4 or more but 10 or less, more preferably 4 or more but 8 or less. The mass ratio within the above ranges can lead to improvement in re-dispersibility.

<Resin Particles>

Examples of the resin particles include, but are not limited to, acrylic resins, styrene resins, styrene-acrylic resins, and polyurethane resins. Of these, acrylic resins and urethane resins are preferable from the viewpoint of fixability onto print media.

The resin particles used may be a homopolymer or a composite polymer using a copolymer. The resin particles used may be of a single-phase structure or a core-shell structure, or may be a power-feed emulsion.

The resin particles usable are resin particles of a polymer having a hydrophilic group and self-dispersibility, and resin particles including a polymer having no dispersibility and a surfactant or another polymer having a hydrophilic group that provides the resin particles with dispersibility. Of these, an emulsion of polymer particles obtained through emulsion polymerization and suspension polymerization of unsaturated monomers is optimal. In the case of emulsion polymerization of unsaturated monomers, a polymer emulsion is obtained through reaction in water containing, for example, unsaturated monomers, a polymerization initiator, a surfactant, a chain transfer agent, a chelator, and a pH regulator. Thus, resin particles can be easily obtained, and intended properties can be easily imparted because it is easy to change polymer constituents.

<<Acrylic Resin>>

The acrylic resin is not particularly limited and may be appropriately selected depending on the intended purpose. For example, the acrylic resin can be obtained using, alone or in combination, unsaturated carboxylic acids, monofunctional or multifunctional (meth)acrylic acid ester monomers, (meth)acrylic acid amide monomers, aromatic vinyl monomers, vinylcyano compound monomers, vinyl monomers, allyl compound monomers, olefin monomers, diene monomers, and oligomers having unsaturated carbon. Combining these monomers makes it possible to flexibly reform properties. Also, polymerization reaction or grafting reaction using an oligomer polymerization initiator makes it possible to reform properties of the polymer Examples of the unsaturated carboxylic acids include, but are not limited to, acrylic acid, methacrylic acid, itaconic acid, fumaric acid, and maleic acid.

Examples of the monofunctional (meth)acrylic acid ester monomers include, but are not limited to, methyl methacrylate, ethyl methacrylate, isopropyl methacrylate, n-butyl methacrylate, isobutyl methacrylate, n-amyl methacrylate, isoamyl methacrylate, n-hexyl methacrylate, 2-ethylhexyl methacrylate, octyl methacrylate, decyl methacrylate, dodecyl methacrylate, octadecyl methacrylate, cyclohexyl methacrylate, phenyl methacrylate, benzyl methacrylate, glycidyl methacrylate, 2-hydroxyethyl methacrylate, 2-hydroxypropyl methacrylate, dimethylaminoethyl methacrylate, methacryloxyethyl trimethyl ammonium salt, 3-methacryloxypropyltrimethoxysilane, methyl acrylate, ethyl acrylate, isopropyl acrylate, n-butyl acrylate, isobutyl acrylate, n-amyl acrylate, isoamyl acrylate, n-hexyl acrylate, 2-ethylhexyl acrylate, octyl acrylate, decyl acrylate, dodecyl acrylate, octadecyl acrylate, cyclohexyl acrylate, phenyl acrylate, benzyl acrylate, glycidyl acrylate, 2-hydroxyethyl acrylate, 2-hydroxypropyl acrylate, dimethylaminoethyl acrylate, and acryloxyethyl trimethyl ammonium salt. One of these may be used alone or two or more of these may be used in combination.

Examples of the multifunctional (meth)acrylic acid ester monomers include, but are not limited to, ethylene glycol dimethacrylate, diethylene glycol dimethacrylate, triethylene glycol dimethacrylate, polyethylene glycol dimethacrylate, 1,3-butylene glycol dimethacrylate, 1,4-butylene glycol dimethacrylate, 1,6-hexanediol dimethacrylate, neopentyl glycol dimethacrylate, dipropylene glycol dimethacrylate, polypropylene glycol dimethacrylate, polybutylene glycol dimethacrylate, 2,2'-bis(4-methacryloxydiethoxyphenyl)propane, trimethylolpropane trimethacrylate, trimethylolethane trimethacrylate, polyethylene glycol diacrylate, triethylene glycol diacrylate, 1,3-butyl ene glycol diacrylate, 1,4-butylene glycol diacrylate, 1,6-hexanediol diacrylate, neopentyl glycol diacrylate, 1,9-nonanediol diacrylate, polypropylene glycol diacrylate, 2,2'-bis(4-acryloxypropyloxyphenyl)propane, 2,2'-bis(4-acryloxydiethoxyphenyl)propane, trimethylolpropane triacrylate, trimethylolethane triacrylate, tetramethylolmethane triacrylate, ditrimethylol tetraacrylate, tetramethylolmethane tetraacrylate, pentaerythritol tetraacrylate, and dipentaerythritol hexaacrylate. One of these may be used alone or two or more of these may be used in combination.

Examples of the (meth)acrylic acid amide monomers include, but are not limited to, acrylamide, methacrylamide, N,N-dimethylacrylamide, methylene bisacrylamide, and 2-acrylamide-2-methylpropane sulfonic acid. One of these may be used alone or two or more of these may be used in combination.

Examples of the aromatic vinyl monomers include, but are not limited to, styrene, α-methyl styrene, vinyltoluene, 4-t-butyl styrene, chlorostyrene, vinylanisole, vinylnaphthalene, and divinylbenzene. One of these may be used alone or two or more of these may be used in combination.

Examples of the vinylcyano compound monomers include, but are not limited to, acrylonitrile and methacrylonitrile.

Examples of the vinyl monomers include, but are not limited to, vinyl acetate, vinylidene chloride, vinyl chloride, vinyl ether, vinyl ketone, vinylpyrrolidone, vinylsulfonic acid or salts thereof, vinyltrimethoxysilane, and vinyltriethoxysilane. One of these may be used alone or two or more of these may be used in combination.

Examples of the allyl compound monomers include, but are not limited to, allylsulfonic acid or salts thereof, allylamine, allyl chloride, di allylamine, and diallyldimethylammonium salt. Examples of the olefin monomers include, but are not limited to, ethylene and propylene. Examples of the diene monomers include, but are not limited to, butadiene and chloroprene.

Examples of the oligomers having unsaturated carbon include, but are not limited to, styrene oligomers having methacryloyl groups, stylene-acrylonitrile oligomers having methacryloyl groups, methyl methacrylate oligomers having methacryloyl groups, dimethylsiloxane oligomers having methacryloyl groups, and polyester oligomers having acryloyl groups.

The acid value of the acrylic resin is preferably from 10 mgKOH/g through 300 mgKOH/g, more preferably from 20 mgKOH/g through 200 mgKOH/g. The acid value is an amount in mg of KOH necessary for neutralizing 1 g of a resin.

The weight average molecular weight (Mw) of the acrylic resin is preferably from 1,000 through 100,000, more preferably from 2,000 through 50,000.

In the present disclosure, the weight average molecular weight (Mw) can be measured through, for example, gel permeation chromatography (GPC).

Preferable specific examples of the acrylic resin include, but are not limited to: GRANDOLL PP-1000EF, BONCOAT 40-418EF, BONCOAT CE-6270, BONCOAT CG-6150, BONCOAT CG-8400, BONCOAT CG-8680, BONCOAT DV-961, BONCOAT EM-401, and BONCOAT PE-200 (all of which are available from DIC CORPORATION); POLYSOL AM-200, POLYSOL M-17N, and POLYSOL AM-610 (all of which are available from SHOWA DENKO K.K.); and X-436, QE-1042, HE-1335, RE-1075, JE-1056, JE-1113, KE-1148, and XP8812 (all of which are available from SEIKO PMC CORPORATION). One of these may be used alone or two or more of these may be used in combination.

<<Polyurethane Resin>>

The polyurethane resin is not particularly limited and may be water-soluble or water-dispersible polyurethane resins obtained through reaction between diisocyanate compounds and diol compounds. One of these may be used alone or two or more of these may be used in combination.

Examples of the diisocyanate compounds include, but are not limited to: alicyclic diisocyanate compounds such as hexamethylene diisocyanate, 2,2,4-trimethylhexamethylene diisocyanate, hydrogenated xylylene diisocyanate, 1,4-cyclohexane diisocyanate, and 4,4-dicyclohexylmethane diisocyanate; araliphatic diisocyanate compounds such as xylylene diisocyanate and tetrametyl xylylene diisocyanate; aromatic diisocyanate compounds such as toluylene diisocyanate and phenylmethane diisocyanate; and modified products of these diisocyanates (carbodiimide, uretdione, and uretimine-containing modified products). One of these may be used alone or two or more of these may be used in combination.

Examples of the diol compounds include, but are not limited to, diol compounds obtained by (co)polymerizing alkylene oxides such as ethylene oxide and propylene oxide or heterocyclic ethers such as tetrahydrofuran. Specific examples of the diol compounds include, but are not limited to: polyether diols such as polyethylene glycol, polypropylene glycol, polytetramethylene ether glycol, and polyhexamethylene ether glycol; polyester diols such as polyethylene adipate, polybutylene adipate, polyneopentyl adipate, poly-3-methylpentyl adipate, polyethylene/butylene adipate, and polyneopentyl/hexyl adipate; polylactone diols such as polycaprolactone diol; and polycarbonate diols. One of these may be used alone or two or more of these may be used in combination. Of these, polyethers, polyesters, and polycarbonates are preferable.

In addition to the above, diol compounds having acid groups such as a carboxylic acid group and a sulfonic acid group can also be used. Specific examples thereof include, but are not limited to, dimethylolacetic acid, dimethylolpropionic acid, and dimethylolbutyric acid. Of these, dimethylolpropionic acid is preferable. Two or more of these diol compounds may be used in combination.

When synthesizing the polyurethane resin, a low-molecular-weight polyhydroxy compound may be added. Examples of the low-molecular-weight polyhydroxy compound include, but are not limited to, those used as raw materials of polyester diols, such as glycol and trivalent alcohols such as glycerin, trimethylolethane, and trimethylolpropane, and alkylene oxide low-mole adducts thereof. The obtained urethane prepolymer can be chain-extended with water or di(tri)amine after or while neutralizing the acid group derived from dimethylolalkanoic acid. Examples of polyamines used for chain extension include, but are not limited to, hexamethylene diamine, isophorone diamine, hydrazine, and piperazine. One of these may be used alone or two or more of these may be used in combination.

Desirable examples of the polyurethane resin include, but are not limited to, polyether-based polyurethane resins, polyester-based polyurethane resins, and polycarbonate-based polyurethane resins, which are obtained using polyether-based diols, polyester-based diols, and polycarbonate-based diols as diol compounds. The form of the polyurethane resin is not particularly limited, either. Representative examples thereof include, but are not limited to, emulsion types such as self-emulsified emulsion and self-stabilized type. Of the above compounds, desirable are urethane resins obtained using diols having acid groups such as a carboxylic acid group and a sulfonic acid group, urethane resins obtained by adding the low-molecular-weight polyhydroxy compound, and urethane resins incorporating acid groups. In particular, urethane resins having carboxyl groups are desirable. From the viewpoints of, for example, an increase in glossiness and an increase in abrasion resistance, it is also desirable that the functional groups such as the carboxyl groups be crosslinked with a crosslinking treatment.

The polyurethane resin used may also be neutralized. Examples of bases used for neutralization include, but are not limited to: alkylamines such as butylamine and triethylamine; alkanolamines such as monoethanolamine, diethanolamine, and triethanolamine; and inorganic bases such as morpholine, ammonia, and sodium hydroxide.

The acid value of the polyurethane resin is preferably from 10 mgKOH/g through 300 mgKOH/g, more preferably from 20 mgKOH/g through 100 mgKOH/g. The acid value is an amount in mg of KOH necessary for neutralizing 1 g of a resin.

The weight average molecular weight (Mw) of the polyurethane resin is preferably from 100 through 200,000, more preferably from 1000 through 50,000. The glass transition temperature (Tg; measured according to JIS K6900) of the polyurethane resin is preferably from −50° C. through 200° C., more preferably from −50° C. through 100° C.

The polyurethane resin usable may be a commercially available product. Examples of the commercially available product include, but are not limited to: NeoRez R-960, NeoRez R-989, NeoRez R-9320, and NeoRad NR-440 (all of which are available from Kusumoto Chemicals, Ltd.); HYDRAN AP-30, HYDRAN APX-601, HYDRAN SP-510, and HYDRAN SP-97 (all of which are available from DIC CORPORATION); SUPERFLEX 130, SUPERFLEX 150, SUPERFLEX 150HS, SUPERFLEX 170, SUPERFLEX 210, SUPERFLEX 300, SUPERFLEX 420, SUPERFLEX 420HS, SUPERFLEX 470, SUPERFLEX 740, SUPER- FLEX 820, SUPERFLEX 830HS, SUPERFLEX 860, and SUPERFLEX 870 (all of which are available from DKS Co. Ltd.); UCOAT UX-310, UCOAT UX-320, UCOAT UX-300, UCOAT UR-700, UCOAT UX-8100, UCOAT UX-2510, UCOAT UX-340, UCOAT UWS-145, PERMARIN UA-150, PERMARIN UA-200, PERMARIN UA-350, PERMARIN UA-368T, and PERMARIN UA-3945 (all of which are available from SANYO CHEMICAL INDUSTRIES, LTD.); and TAKELAC W-5030, TAKELAC W-6010, TAKELAC W-6020, TAKELAC W-6061, TAKELAC W-605, TAKELAC W-5661, and TAKELAC W-6110 (all of which are available from Mitsui Chemicals, Inc.). One of these may be used alone or two or more of these may be used in combination.

The average particle diameter ($D_{50}$) of the binder polymer is related to the viscosity of a dispersion liquid. When the formulation is the same, the viscosity in the same solid content becomes higher as the particle diameter becomes smaller. In order to prevent the resultant ink from having excessively high viscosity, the average particle diameter ($D_{50}$) of the binder polymer is preferably 50 nm or more. When the particle diameter is several tens micrometers, such particles cannot be used because their size is larger than the nozzle opening of an inkjet head. The presence in an ink of particles that are smaller than the nozzle opening but have large particle diameters deteriorates dischargeability of the ink. In order for the binder polymer not to inhibit ink dischargeability, the average particle diameter ($D_{50}$) is preferably 200 nm or smaller, more preferably 150 nm or smaller.

The average particle diameter ($D_{50}$) can be measured using MICROTRAC UPA-EX150 (available from Microtrac Inc.).

The binder polymer added to an ink is preferably 0.1 times or more but 3 times or less the solid content of the inorganic pigment dispersoids. Specifically, from the viewpoint of fixability onto print media, the amount of the binder polymer in the ink is 0.5% by mass or more but 20% by mass or less, more preferably 1% by mass or more but 15% by mass or less, in terms of the solid content.

<Organic Solvent>

The organic solvent is a component necessary from the viewpoint of ensuring dispersion stability and discharge stability, and is preferably a water-soluble organic solvent from the environmental point of view.

The water-soluble organic solvent preferably contains at least one selected from the group consisting of amide compounds represented by General Formula (1) below, alkanediols, glycol ethers, from the viewpoint of easily wetting poorly permeable bases and non-permeable bases.

General Formula (1)

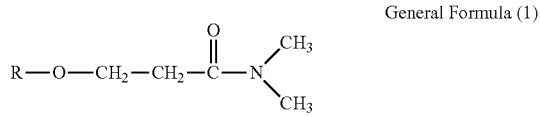

In the above General Formula (1), R represents a straight chain or branched alkyl group having from 1 through 6 carbon atoms.

Examples of the straight chain or branched alkyl group having from 1 through 6 carbon atoms include, but are not limited to, a methyl group, an ethyl group, a propyl group, an isopropl group, a butyl group, and a pentyl group. Of these, a methyl group is preferable.

Examples of the compounds represented by the above General Formula (1) include, but are not limited to, 3-methoxy-N,N-dimethylpropionamide represented by Structural Formula (1) below, 3-butoxy-N,N-dimethylpropionamide, and 3-methoxy-N,N-diethylpropionamide.

Structural Formula (1)

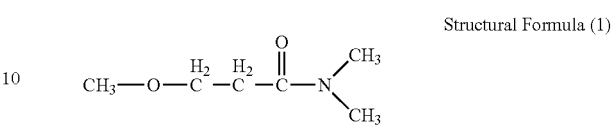

The amide compound represented by the above Structural Formula (1) has a high boiling point of 216° C., a high equilibrium moisture content of 39.2% by mass at 23° C. and relative humidity (RH) of 80%, and has a very low liquid viscosity of 1.48 mPa s at 25° C. This amide compound very easily dissolves in an organic solvent and water to make it possible to reduce the viscosity of the resultant ink. This is particularly preferable as a water-soluble organic solvent of the ink.

The alkanediols and glycol ethers used in the ink of the present disclosure preferably contain alkanediol and glycol ether each having a boiling point of 90° C. or higher but lower than 250° C., from the viewpoint of ensuring discharge stability and dispersion stability of inorganic pigment 1 and inorganic pigment 2.

<<Alkanediols>>

Examples of the alkanediols include, but are not limited to, 1,2-alkanediols such as ethylene glycol (boiling point: 197° C.), propylene glycol (boiling point: 188° C.), 1,2-butanediol (boiling point: 193° C.), 1,2-pentanediol (boiling point: 206° C.), and 1,2-hexanediol (boiling point: 223° C.); diethylene glycol (boiling point: 245° C.), polyethylene glycol, dipropylene glycol (boiling point: 232° C.), 1,3-propanediol (boiling point: 210° C.), 1,3-butanediol (boiling point: 208° C.), 1,4-butanediol (boiling point: 230° C.), 3-methy-1,3-butanediol (boiling point: 203° C.), 1,5-pentanediol (boiling point: 242° C.), 2-methyl-2,4-pentanediol (boiling point: 196° C.), 1,2,6-hexanetriol (boiling point: 178° C.), 1,2,4-butanetriol (boiling point: 190° C.), 1,2,3-butanetriol (boiling point: 175° C.), and 3-methylpentane-1,3,5-triol (boiling point: 216° C.). One of these may be used alone or two or more of these may be used in combination.

Of these, from the viewpoint of ensuring discharge stability and dispersion stability of inorganic pigment 1 and inorganic pigment 2, preferable is at least one selected from the group consisting of alkanediols having 2 or more but 6 or less carbon atoms such as propylene glycol, diethylene glycol, and 1,2-hexanediol, and polypropylene glycols having molecular weights of from 500 through 1,000, and more preferable is at least one selected from the group consisting of 1,2-alkanediols having 3 or more but 4 or less carbon atoms such as propylene glycol and diethylene glycol, and the above polypropylene glycols.

<<Glycol Ethers>>

Specific examples of the glycol ethers include, but are not limited to, alkylene glycol monoalkyl ethers and alkylene glycol dialkyl ethers. Of these, from the viewpoint of ensuring discharge stability and dispersion stability of inorganic pigment 1 and inorganic pigment 2, alkylene glycol monoalkyl ethers are preferable.

The number of carbon atoms of the alkyl group of the alkylene glycol monoalkyl ether is preferably 1 or more, more preferably 2 or more, further preferably 3 or more. The number of carbon atoms of the alkyl group of the alkylene glycol monoalkyl ether is preferably 6 or less, more preferably 4 or less. The alkyl group of the alkylene glycol monoalkyl ether is, for example, a straight chain or branched alkyl group.

Specific examples of the alkylene glycol monoalkyl ethers include, but are not limited to, ethylene glycol ethyl ether (boiling point: 136° C.), ethylene glycol isopropyl ether (boiling point: 144° C.), ethylene glycol propyl ether (boiling point: 151° C.), ethylene glycol butyl ether (boiling point: 171° C.), diethylene glycol methyl ether (boiling point: 194° C.), diethylene glycol ethyl ether (boiling point: 202° C.), diethylene glycol isopropyl ether (boiling point: 207° C.), diethylene glycol isobutyl ether (boiling point: 220° C.), diethylene glycol butyl ether (boiling point: 230° C.), triethylene glycol methyl ether (boiling point: 248° C.), dipropylene glycol butyl ether (boiling point: 231° C.), dipropylene glycol methyl ether (boiling point: 189° C.), and tripropylene glycol methyl ether (boiling point: 243° C.). One of these may be used alone or two or more of these may be used in combination.

Of these, preferable is one or more selected from the group consisting of ethylene glycol isopropyl ether, ethylene glycol propyl ether, diethylene glycol methyl ether, diethylene glycol isopropyl ether, diethylene glycol isobutyl ether, and diethylene glycol butyl ether, and more preferable is one or more selected from the group consisting of ethylene glycol isopropyl ether, diethylene glycol isopropyl ether, and diethylene glycol isobutyl ether.

<<Other Water-Soluble Organic Solvents>>

In addition to the above water-soluble organic solvents, the ink may also include other alcohols usually contained in aqueous inks, alkyl ethers and glycol ethers of these alcohols, nitrogen-containing heterocyclic compounds such as N-methyl-2-pyrrolidone, and amides, amines, and sulfur-containing compounds.

For example, 1,6-hexanediol (boiling point: 250° C.), triethylene glycol (boiling point: 285° C.), tripropylene glycol (boiling point: 273° C.), polypropylene glycol (boiling point: 250° C. or higher), glycerin (boiling point: 290° C.), and/or other compounds may be used in combination with compounds having boiling points of 250° C. or higher.

From the viewpoints of easily wetting poorly permeable bases and non-permeable bases and providing excellent discharge stability, the amount of the organic solvent in the ink is preferably 10% by mass or more but 90% by mass or less, more preferably 20% by mass or more but 80% by mass or less.

Also, from the viewpoints of easily wetting poorly permeable bases and non-permeable bases and providing excellent discharge stability, the amount of the amide compound represented by the above General Formula (I) is preferably 5% by mass or more but 50% by mass or less, further preferably 10% by mass or more but 40% by mass or less, relative to the total of the organic solvent in the ink. The amount of the alkanediol is preferably 5% by mass or more but 90% by mass or less, further preferably 10% by mass or more but 80% by mass or less, relative to the total of the organic solvent in the ink. The amount of the glycol ether is preferably 5% by mass or more but 50% by mass or less, further preferably 10% by mass or more but 40% by mass or less, relative to the total of the organic solvent in the ink.

<Additive>

Ink may further optionally contain a surfactant, a defoaming agent, a preservative and fungicide, a corrosion inhibitor, a pH regulator, etc.

<Surfactant>

Examples of the surfactant are silicone-based surfactants, fluorosurfactants, amphoteric surfactants, nonionic surfactants, anionic surfactants, etc.

The silicone-based surfactant has no specific limit and can be suitably selected to suit to a particular application.

Of these, preferred are silicone-based surfactants which are not decomposed even in a high pH environment. Specific examples thereof include, but are not limited to, side-chain-modified polydimethylsiloxane, both end-modified polydimethylsiloxane, one-end-modified polydimethylsiloxane, and side-chain-both-end-modified polydimethylsiloxane. A silicone-based surfactant having a polyoxyethylene group or a polyoxyethylene polyoxypropylene group is particularly preferable because such an agent demonstrates good characteristics as an aqueous surfactant. It is possible to use a polyether-modified silicone-based surfactant as the silicone-based surfactant. A specific example thereof is a compound in which a polyalkylene oxide structure is introduced into the side chain of the Si site of dimethyl siloxane.

Specific examples of the fluorosurfactants include, but are not limited to, perfluoroalkyl sulfonic acid compounds, perfluoroalkyl carboxylic acid compounds, perfluoroalkyl phosphoric acid ester compounds, adducts of perfluoroalkyl ethylene oxide, and polyoxyalkylene ether polymer compounds having a perfluoroalkyl ether group in its side chain. These are particularly preferable because they do not foam easily. Specific examples of the perfluoroalkyl sulfonic acid compounds include, but are not limited to, perfluoroalkyl sulfonic acid and salts of perfluoroalkyl sulfonic acid. Specific examples of the perfluoroalkyl carboxylic acid compounds include, but are not limited to, perfluoroalkyl carboxylic acid and salts of perfluoroalkyl carboxylic acid. Specific examples of the polyoxyalkylene ether polymer compounds having a perfluoroalkyl ether group in its side chain include, but are not limited to, sulfuric acid ester salts of polyoxyalkylene ether polymer having a perfluoroalkyl ether group in its side chain and salts of polyoxyalkylene ether polymers having a perfluoroalkyl ether group in its side chain. Counter ions of salts in these fluorosurfactants are, for example, Li, Na, K, $NH_4$, $NH_3CH_2CH_2OH$, $NH_2(CH_2CH_2OH)_2$, and $NH(CH_2CH_2OH)_3$.

Specific examples of the amphoteric surfactants include, but are not limited to, lauryl aminopropionic acid salts, lauryl dimethyl betaine, stearyl dimethyl betaine, and lauryl dihydroxyethyl betaine.

Specific examples of the nonionic surfactants include, but are not limited to, polyoxyethylene alkyl phenyl ethers, polyoxyethylene alkyl esters, polyoxyethylene alkyl amines, polyoxyethylene alkyl amides, polyoxyethylene propylene block polymers, sorbitan aliphatic acid esters, polyoxyethylene sorbitan aliphatic acid esters, and adducts of acetylene alcohol with ethylene oxides, etc.

Specific examples of the anionic surfactants include, but are not limited to, polyoxyethylene alkyl ether acetates, dodecyl benzene sulfonates, laurates, and polyoxyethylene alkyl ether sulfates.

These can be used alone or in combination.

The silicone-based surfactant has no particular limit. Specific examples thereof include, but are not limited to, side-chain-modified polydimethyl siloxane, both end-modified polydimethylsiloxane, one-end-modified polydimethylsiloxane, and side-chain-both-end-modified polydimethylsiloxane. In particular, a polyether-modified silicone-based surfactant having a polyoxyethylene group or a polyoxyethylene polyoxypropylene group is particularly preferable because such a surfactant demonstrates good characteristics as an aqueous surfactant.

Any suitably synthesized surfactant and any product thereof available on the market is suitable. Products available on the market are obtained from BYK Chemie K.K., Shin-Etsu Silicone Co., Ltd., Dow Corning Toray Co., Ltd., etc., NIHON EMULSION Co., Ltd., Kyoeisha Chemical Co., Ltd., etc.

The polyether-modified silicon-containing surfactant has no particular limit. For example, a compound in which the polyalkylene oxide structure represented by the following Chemical structure S-1 is introduced into the side chain of the Si site of dimethyl polysiloxane.

Chemical structure S-1

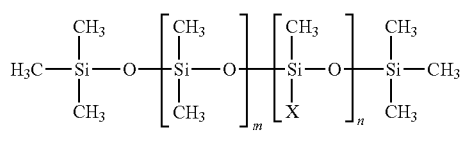

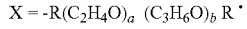

In the Chemical structure S-1, "m", "n", "a", and "b" each, respectively represent integers, R represents an alkylene group, and R' represents an alkyl group.

Specific examples of polyether-modified silicone-based surfactants include, but are not limited to, KF-618, KF-642, and KF-643 (all manufactured by Shin-Etsu Chemical Co., Ltd.), EMALEX-SS-5602 and SS-1906EX (both manufactured by NIHON EMULSION Co., Ltd.), FZ-2105, FZ-2118, FZ-2154, FZ-2161, FZ-2162, FZ-2163, and FZ-2164 (all manufactured by Dow Corning Toray Co., Ltd.), BYK-33 and BYK-387 (both manufactured by BYK Chemie K.K.), and TSF4440, TSF4452, and TSF4453 (all manufactured by Momentive Performance Materials Inc.).

A fluorosurfactant in which the number of carbon atoms replaced with fluorine atoms is from 2 to 16 is preferable and, 4 to 16, more preferable.

Specific examples of the fluorosurfactants include, but are not limited to, perfluoroalkyl phosphoric acid ester compounds, adducts of perfluoroalkyl ethylene oxide, and polyoxyalkylene ether polymer compounds having a perfluoroalkyl ether group in its side chain.

Of these, polyoxyalkylene ether polymer compounds having a perfluoroalkyl ether group in its side chain are preferable because they do not foam easily and the fluorosurfactant represented by the following Chemical formula F-1 or Chemical formula F-2 is more preferable.

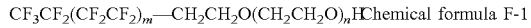

In the Chemical formula F-1, "m" is preferably 0 or an integer of from 1 to 10 and "n" is preferably 0 or an integer of from 1 to 40. Chemical formula F-2

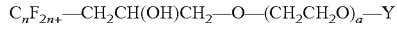

In the Chemical formula F-2, Y represents H, $C_mF_{2m+1}$, where m represents an integer of from 1 to 6, $H_2CH(OH)CH_2—C_mF_{2m+1}$, where m represents an integer of from 4 to 6, or $C_pH_{2p+1}$, where p represents an integer of from 1 to 19. "n" represents an integer of from 1 to 6. "a" represents an integer of from 4 to 14.

Products available on the market may be used as the fluorosurfactant.

Specific examples of the products available on the market include, but are not limited to, SURFLON S-111, SURFLON S-112, SURFLON S-121, SURFLON S-131, SURFLON S-132, SURFLON S-141, and SURFLON S-145 (all manufactured by ASAHI GLASS CO., LTD.); FLUORAD FC-93, FC-95, FC-98, FC-129, FC-135, FC-170C, FC-430, and FC-431 (all manufactured by SUMITOMO 3M); MEGAFACE F-470, F-1405, and F-474 (all manufactured by DIC CORPORATION); ZONYL™ TBS, FSP, FSA, FSN-100, FSN, FSO-100, FSO, FS-300, UR, CAPSTONE® FS-30, FS-31, FS-3100, FS-34, FS-35 (all manufactured by The Chemours Company); FT-110, FT-250, FT-251, FT-400S, FT-150, and FT-400SW (all manufactured by NEOS COMPANY LIMITED); POLYFOX PF-136A, PF-156A, PF-151N, PF-154, PF-159 (manufactured by OMNOVA SOLUTIONS INC.), and UNIDYNE DSN-403N (manufactured by DAIKIN INDUSTRIES). Of these, FT-110, FT-250, FT-251, FT-400S, FT-150, and FT-400SW (all manufactured by The Chemours Company), PolyFox PF-151N (manufactured by OMNOVA SOLUTIONS INC.), and UNIDYNE DSN-403N (manufactured by DAIKIN INDUSTRIES) are particularly preferable in terms of good printing quality, coloring in particular, and improvement on permeation, wettability, and uniform dying property to paper.

The proportion of the surfactant in ink is not particularly limited. It is preferably from 0.001 to 5 percent by mass and more preferably from 0.05 to 5 percent by mass ink in terms of excellent wettability and discharging stability and improvement on image quality.

<Defoaming Agent>

The defoaming agent has no particular limit. For example, silicon-based defoaming agents, polyether-based defoaming agents, and aliphatic acid ester-based defoaming agents are suitable. These can be used alone or in combination. Of these, silicone-based defoaming agents are preferable to easily break foams.

<Preservatives and Fungicides>

The preservatives and fungicides are not particularly limited. A specific example is 1,2-benzisothiazolin-3-on.

<Corrosion Inhibitor>

The corrosion inhibitor has not particular limit. Examples thereof are acid sulfite and sodium thiosulfate.

<pH regulator>

The pH regulator has no particular limit. It is preferable to adjust the pH to 7 or higher. Specific examples thereof include, but are not limited to, amines such as diethanol amine and triethanol amine.

The property of the ink is not particularly limited. For example, viscosity, surface tension, pH, etc., are preferably in the following ranges.

The viscosity of the ink at 25 degrees C. is preferably from 5 to 30 mPa·s and more preferably from 5 to 25 mPa·s to improve print density and text quality and obtain good dischargeability. The viscosity can be measured by, for example, a rotatory viscometer (RE-80L, manufactured by TOKI SANGYO CO., LTD.). The measuring conditions are as follows:

Standard cone rotor (1° 34'×R24)
Sample liquid amount: 1.2 mL
Number of rotations: 50 rotations per minute (rpm)
25 degrees C.
Measuring time: three minutes The surface tension of the ink is preferably 35 mN/m or less and more preferably 32 mN/m or less at 25 degrees C. in terms that the ink is suitably levelized on a print medium and the drying time of the ink is shortened.

The pH of the ink is preferably from 7 to 12 and more preferably from 8 to 11 in terms of prevention of corrosion of metal materials contacting the ink.

The ink deposition amount by an inkjet printing method is preferably from 1.5 g/m$^2$ through 25 g/m$^2$. When the ink deposition amount is 1.5 g/m$^2$ or more, sufficient image density can be obtained. When it is 25 g/m$^2$ or less, sufficient fixability can be obtained.

(Image Forming Method and Image Forming Apparatus)

The image forming method of the present disclosure includes an ink flying step of applying a stimulus to the ink of the present disclosure to allow the ink to fly, to print an image.

The image forming apparatus of the present disclosure includes an ink container containing the ink of the present disclosure and an ink flying unit configured to allow the ink to fly to print an image. If necessary, the image forming apparatus further includes other units.

Examples of methods for applying a stimulus to the ink to allow the ink to fly (an ink discharging method) include, but are not limited to, a method of flying the ink by applying to the ink a stimulus that is at least one selected from the group consisting of heat, pressure, vibration, and light. A preferable method is discharging the ink using a thermal or piezoelectric printing head. In the present disclosure, more preferable is a method in which a container charged with the ink is mounted to an inkjet printing device and the ink is discharged using a piezoelectric printing head to print an image on a print medium.

A re-dispersing unit may be used to suppress aggregation or settlement in a nozzle of the printing head to obtain a good printed matter. The re-dispersing unit may be a unit configured to disperse a pigment in a dispersion medium by a mechanical force. Examples of the re-dispersing unit include, but are not limited to, a mechanism configured to stir an ink in the container charged with the ink, a stirring mechanism, a vibration applying mechanism, and a mechanism configured to circulate an ink.

The image forming method of the present disclosure is preferably applied to solid printing of, for example, an underlying layer from the viewpoint of whiteness.

The print medium is not particularly limited. Examples of the print medium include, but are not limited to, corrugated paper, paperboard, color cast-coated paper, and resin films. Preferable examples thereof include, but are not limited to, color cast-coated paper and resin films. Of these, the image forming method of the present disclosure can favorably exhibit its effects when used for non-permeable bases. The non-permeable bases are bases having surfaces of low water permeability and absorbability. The non-permeable bases also include materials having many voids inside but having no voids exposed to the outside. Quantitatively speaking, the non-permeable bases refer to bases that absorb water in an amount of 10 mL/m$^2$ or less from the start of contact until 30 msec$^{1/2}$ in the Bristow method.

Examples of the color cast-coated paper include, but are not limited to: COLOR GLORIA BLACK (275 g/m$^2$), COLOR GLORIA BLACK (310 g/m$^2$), and COLOR GLORIA BLACK A (326 g/m$^2$) (all of which are available from Gojo Paper MFG. CO. Ltd.); ESPRIT COLOR BLUE (320 g/m$^2$) and ESPRIT COLOR GREEN (320 g/m$^2$) (both of which are available from NIPPON PAPER INDUSTRIES CO., LTD.); LUMINA COLOR BLACK (270 g/m$^2$), LUMINA COLOR BLACK (310 g/m$^2$), and LUMINA CARD BLACK (330 g/m$^2$) (all of which are available from Oji F-Tex Co., Ltd.); and LK COLOR BLACK (350 g/m$^2$), LK COLOR BLACK (430 g/m$^2$), LK COLOR BLUE (350 g/m$^2$), and LK COLOR BLUE (430 g/m$^2$) (all of which are available from MITSUBISHI PAPER MILLS LIMITED).

Examples of the resin films include, but are not limited to, polyester films, polyvinyl chloride films, polypropylene films, polyethylene films, and nylon films. These films may be a biaxially stretched film, a uniaxially stretched film, or an unstretched film. The resin films are more preferably one or more selected from the group consisting of polyester films and stretched polypropylene films. Further preferably, the resin films are polyester films (e.g., polyethylene terephthalate) and biaxially stretched polypropylene films, which are subjected to a surface treatment such as a colona discharge treatment.

Examples of commercially available products of transparent synthetic resin films include, but are not limited to, LUMIRROR T60 (polyethylene terephthalate, available from Toray Industries, Inc.), FE2001 (corona-treated polyethylene terephthalate, available from Futamura Chemical Corporation), FOS #60 (corona-treated biaxially stretched polypropylene film, available from Futamura Chemical Co., Ltd.), PVC80BP (polyvinyl chloride, available from Lintec Corporation), KINATH KEE70CA (polyethylene, available from Lintec Corporation), YUPO SG90 PATI (polypropylene, available from Lintec Corporation), and BONYL RX (nylon, available from KOHJIN Film & Chemicals Co., Ltd.).

(Image Forming Method and Image Forming Apparatus)

The image forming method of the present disclosure includes an ink flying step of applying a stimulus to the ink of the present disclosure to allow the ink to fly, to print an image. If necessary, the image forming method further includes other units.

The image forming apparatus of the present disclosure includes an ink container containing the ink of the present disclosure and an ink flying unit configured to allow the ink to fly to print an image. If necessary, the image forming apparatus further includes other units.

The ink of the present disclosure can be suitably applied to various printing devices employing an inkjet printing method such as printers, facsimile machines, photocopiers, multifunction peripherals (serving as a printer, a facsimile machine, and a photocopier), and 3D model manufacturing devices.

In the present disclosure, the printing device and the printing method represent a device capable of discharging ink, pre-coating liquids, etc. to a print medium and a method printing an image on the print medium using the device. The print medium means an article to which the ink or the various processing fluids can be attached at least temporarily.

The printing device may further optionally include a device to attach pre-coating liquid and a device relating to feeding, transferring, and ejecting the print medium and other devices referred to as a pre-processing device, a post-processing device, etc. in addition to the head portion to discharge the ink.

The printing device and the printing method may further optionally include a heater for use in the heating process and a drier for use in the drying process. For example, the heating device and the drying device heat and dry the top surface and the bottom surface of a print medium having an image. The heating device and the drying device are not particularly limited. For example, a fan heater and an infra-red heater can be used. The print medium can be heated and dried before, during, and after printing.

In addition, the printing device and the printing method are not limited to those producing merely meaningful visible images such as texts and figures with the ink. For example, the printing device and the printing method can produce patterns like geometric design and 3D images.

In addition, the printing device includes both a serial type device in which the liquid discharging head is caused to move and a line type device in which the liquid discharging head is not moved, unless otherwise specified.

Furthermore, in addition to the desktop type, this printing device includes a wide type capable of printing images on a large print medium such as A0, a continuous printer capable of using continuous paper wound up in a roll form as print media.

Figure 2:
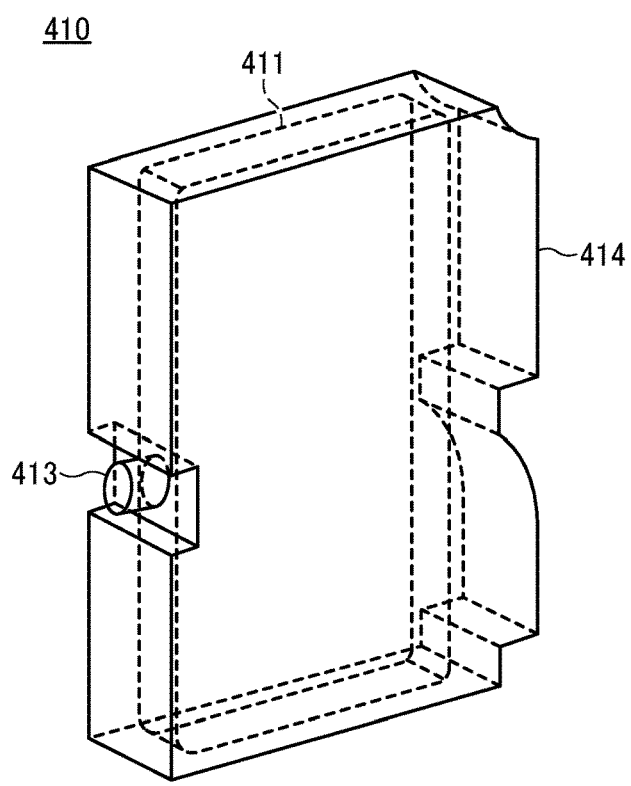
FIG. 2 is a perspective view illustrating a main tank in the image forming apparatus according to an embodiment of the present invention.

The printing device of the present disclosure is described using an example with reference to FIG. 1 and FIG. 2. FIG. 1 is a perspective view illustrating the image printing device. FIG. 2 is a perspective view illustrating the main tank. An image forming apparatus 400 as an example of the printing device is a serial type image forming apparatus. A mechanical unit 420 is disposed in an exterior 401 of the image forming apparatus 400. Each ink accommodating unit (ink container) 411 of each main tank 410 (410k, 410c, 410m, and 410y) for each color of black (K), cyan (C), magenta (M), and yellow (Y) is made of a packing member such as aluminum laminate film. The ink container 411 is accommodated in a plastic housing unit 414. As a result, the main tank 410 is used as an ink cartridge of each color.

A cartridge holder 404 is disposed on the rear side of the opening when a cover 401c is opened. The cartridge holder 404 is detachably attached to the main tank 410. As a result, each ink discharging outlet 413 of the main tank 410 is communicated with a discharging head 434 (as an ink flying unit) for each color via a supplying tube 436 for each color so that the ink can be discharged from the discharging head 434 to a print medium.

This printing device may include not only a portion discharging ink but also a device referred to as a pre-processing device, a post-processing device, etc.

As an example of the pre-processing device and the post-processing device, as in the case of the ink such as black (K), cyan (C), magenta (M), and yellow (Y), a liquid container containing a pre-processing fluid or a post-processing fluid and a liquid discharging head are added to discharge the pre-processing fluid or the post-processing fluid in an inkjet printing method.

As another example of the pre-processing device and the post-processing device, it is suitable to dispose a pre-processing device and a post-processing device employing a blade coating method, a roll coating method, or a spray coating method other than the inkjet printing method.

How to use the ink is not limited to the inkjet printing method. Specific examples of such methods other than the inkjet printing method include, but are not limited to, blade coating methods, gravure coating methods, bar coating methods, roll coating methods, dip coating methods, curtain coating methods, slide coating methods, die coating methods, and spray coating methods.

(Printed Matter)

The printed matter of the present disclosure includes a print medium and an image formed on the print medium with the ink of the present disclosure.

An inkjet printing device and an inkjet printing method are used to print the image on the print medium to obtain the printed matter.

The printed matter of the present disclosure is a printed matter including a print medium and a printed layer on the print medium.

The printed layer includes a resin, a first inorganic pigment, and a second inorganic pigment.

The first inorganic pigment comprises particulate titanium oxide.

The second inorganic pigment comprises at least one selected from the group consisting of acicular titanium oxide, fusiform titanium oxide, and silica particles.

Moreover, image forming, recording, printing, etc. in the present disclosure represent the same meaning.

EXAMPLES

The present disclosure will be described below by way of Examples. The present disclosure should not be construed as being limited to these Examples.

<Number Average Primary Particle Diameter of Particulate Titanium Oxide and Silica Particles>

The number average primary particle diameter of particulate titanium oxide or silica particles was defined as a value determined in the following manner. Specifically, a transmission electron microscope (device name: JEM-2100F, obtained from JEOL Ltd.) was used to measure unidirectional particle diameters of 200 or more but 500 or less primary particles in a field of view at a magnification of 30,000, with the primary particles held between two parallel unidirectional lines. Then, the numerical values falling within the top 5% and within the bottom 5% were excluded, and the numerical values falling within the remaining 90% were averaged. The obtained average value was defined as the number average primary particle diameter of the particulate titanium oxide or the silica particles.

<Measurement Method of Aspect Ratios of Particulate Titanium Oxide, Acicular Titanium Oxide, and Fusiform Titanium Oxide>

The aspect ratio of particulate titanium oxide, acicular titanium oxide, or fusiform titanium oxide was calculated in the following manner. Specifically, a transmission electron microscope (device name: JEM-2100F, obtained from JEOL Ltd.) was used to measure major axis lengths and minor axis lengths of 200 particles of the titanium oxide in a field of view at a magnification of 30,000. The major axis lengths were averaged to obtain an average major axis length, and the minor axis lengths were averaged to obtain an average minor axis length. The average major axis length was divided by the average minor axis length to calculate the aspect ratio.

<Measurement Method of Average Crystallite Diameters of Acicular Titanium Oxide and Fusiform Titanium Oxide>

Using an X-ray diffractometer (Rigaku RINT-2200V), each sample was subjected to XRD analysis using CuKα rays. Through crystal structure analysis, average crystallite diameters of acicular titanium oxide and fusiform titanium oxide were calculated.

(Preparation Example 1 of Resin Dispersion Liquid)

<Preparation of Polyester Urethane Resin Dispersion Liquid 1>

In a nitrogen-purged container equipped with a thermometer, a nitrogen gas introducing tube, and a stirrer, 200.4 g of polyester polyol (product name: PTMG1,000, obtained from Mitsubishi Chemical Corporation, average molecular weight: 1,000), 15.7 g of 2,2-dimethylolpropionic acid, 48.0 g of isophorone diisocyanate, and 77.1 g of methyl ethyl ketone as an organic solvent were allowed to react using 0.06 g of dibutyltin dilaurate (DMTDL, obtained from Tokyo Chemical Industry Co., Ltd.) as a catalyst. After the reaction had been allowed to continue for 4 hours, 30.7 g of methyl ethyl ketone was added as a diluent solvent and the reaction was allowed to further continue. The reaction was performed for a total of 6 hours and was terminated by the addition of 1.4 g of methanol to obtain an organic solvent solution of a urethane resin. By adding 13.4 g of a 48% by mass aqueous potassium hydroxide solution to the organic solvent solution of the urethane resin, the carboxyl groups of the urethane resin were neutralized. Then, 715.3 g of water was added, and the resultant mixture was sufficiently stirred, followed by aging and solvent removal, to obtain polyester urethane resin dispersion liquid 1 containing resin particles at 30% by mass as the solid content concentration.

(Preparation Example 2 of Resin Dispersion Liquid)
<Preparation of Polyester Urethane Resin Dispersion Liquid 2>

In the same manner as in Preparation Example 1 of Resin Dispersion Liquid except that the amount of the DMTDL was changed from 0.06 g to 0.12 g and the total reaction time was changed from 6 hours to 8 hours, polyester urethane resin dispersion liquid 2 containing resin particles at 30% by mass as the solid content concentration was obtained.

(Preparation Example 3 of Resin Dispersion Liquid)
<Preparation of Polycarbonate Urethane Resin Dispersion Liquid>

A reaction container to which a stirrer, a reflux condenser, and a thermometer had been inserted was charged with 1,500 g of a reaction product (number average molecular weight (Mn): 1,200) between polycarbonate diol (1,6-hexanediol) and dimethyl carbonate, 220 g of 2,2-dimethylolpropionic acid (DMPA), and 1,347 g of N-methylpyrrolidone (NMP) under a nitrogen stream. The resultant mixture was heated to 60° C. to dissolve the DMPA.

Then, 1,445 g (5.5 mol) of 4,4'-dicyclohexylmethane diisocyanate and 2.6 g of dibutyltin dilaurate (catalyst) were added. The resultant mixture was heated to 90° C. to undergo a urethanation reaction for 5 hours, to obtain an isocyanate-terminated urethane prepolymer. This reaction mixture was cooled to 80° C., and 149 g of triethylamine was added thereto, followed by mixing. 4,340 g of the resultant reaction mixture was extracted and added under vigorous stirring to a mixture solution containing 5,400 g of water and 15 g of triethylamine.

Then, 1,500 g of ice was added and 626 g of a 35% by mass 2-methyl-1,5-pentanediamine aqueous solution was added to perform a chain extension reaction. The solvent was evaporated so that the solid content concentration would be 30% by mass, to obtain polycarbonate urethane resin dispersion liquid 1 having a structure derived from an alicyclic diisocyanate.

(Preparation Example 4 of Resin Dispersion Liquid)
<Preparation of Acrylic Resin Dispersion Liquid>

A reaction container equipped with a stirrer, a reflux condenser, a dropping device, and a thermometer was charged with 900 g of ion-exchanged water and 1 g of sodium lauryl sulfate. The resultant mixture was heated to 70° C. under stirring while the reaction container was being purged with nitrogen. With the internal temperature kept at 70° C., 2 g of potassium persulfate was added as a polymerization initiator. After dissolution, an emulsion, which had been prepared in advance by adding 3 g of sodium lauryl sulfate, 20 g of acrylamide, 365 g of styrene, 545 g of butyl acrylate, and 10 g of methacrylic acid to 450 g of ion-exchanged water, was continuously dropped into the reaction solution for 6 hours. After completion of the dropping, the resultant mixture was aged for 3 hours.

The obtained aqueous particles were cooled to ambient temperature. Then, ion-exchanged water and an aqueous sodium hydroxide solution were added to adjust the solid content concentration to 30% by mass and the pH to 8, to obtain an acrylic resin dispersion liquid containing acrylic resin particles.

(Preparation Example 1 of Titanium Oxide Dispersion Liquid)
<Preparation of Titanium Oxide Dispersion Liquid 1>

20 g of particulate titanium dioxide (obtained from TAYCA CORPORATION, product name "JR-403", number average primary particle diameter: 250 nm, aspect ratio: 2, surface treatment: Al, Si), 5 g of a pigment dispersant (product name: TEGO Dispers 651, obtained from EVONTK Co.), and 75 g of water were mixed together. The resultant mixture was dispersed for 5 minutes at 8 m/s using a bead mill (device name: Research Lab, obtained from SHINMARU ENTERPRISES CORPORATION) containing zirconia beads (diameter: 0.3 mm) at a filling rate of 60%. The resultant dispersion was filtrated through a membrane filter having an average pore diameter of 5 μm (a cellulose acetate membrane) to obtain [titanium oxide dispersion liquid 1] (concentration of titanium dioxide particles: 20% by mass).

(Preparation Example 2 of Titanium Oxide Dispersion Liquid)
<Preparation of Titanium Oxide Dispersion Liquid 2>

[Titanium oxide dispersion liquid 2] (concentration of titanium dioxide particles: 20% by mass) was obtained in the same manner as in Preparation Example 1 of Titanium Oxide Dispersion Liquid except that the particulate titanium dioxide (obtained from TAYCA CORPORATION, product name "JR-403", number average primary particle diameter: 250 nm, aspect ratio: 2, surface treatment: Al, Si) was changed to particulate titanium dioxide (product name: JR-405, obtained from TAYCA CORPORATION, number average primary particle diameter: 210 nm, aspect ratio: 2, surface treatment: Al).

(Preparation Example 3 of Titanium Oxide Dispersion Liquid)
<Preparation of Titanium Oxide Dispersion Liquid 3>

[Titanium oxide dispersion liquid 3] (concentration of titanium dioxide particles: 20% by mass) was obtained in the same manner as in Preparation Example 1 of Titanium Oxide Dispersion Liquid except that the particulate titanium dioxide (obtained from TAYCA CORPORATION, product name "JR-403", number average primary particle diameter: 250 nm, aspect ratio: 2, surface treatment: Al, Si) was changed to particulate titanium dioxide (product name: JR-603, obtained from TAYCA CORPORATION, number average primary particle diameter: 300 nm, aspect ratio: 3, surface treatment: Zr).

(Preparation Example 4 of Titanium Oxide Dispersion Liquid)
<Preparation of Titanium Oxide Dispersion Liquid 4>

[Titanium oxide dispersion liquid 4] (concentration of titanium dioxide particles: 20% by mass) was obtained in the same manner as in Preparation Example 1 of Titanium Oxide Dispersion Liquid except that the particulate titanium dioxide (obtained from TAYCA CORPORATION, product name "JR-403", number average primary particle diameter: 250 nm, aspect ratio: 2, surface treatment: Al, Si) was changed to acicular titanium dioxide (product name: ST-485SA15, obtained from Titan Kogyo, Ltd., average crystallite diameter: 8 nm, aspect ratio: 10, surface treatment: aluminum hydroxide, stearic acid).

(Preparation Example 5 of Titanium Oxide Dispersion Liquid)

<Preparation of Titanium Oxide Dispersion Liquid 5>

[Titanium oxide dispersion liquid 5] (concentration of titanium dioxide particles: 20% by mass) was obtained in the same manner as in Preparation Example 1 of Titanium Oxide Dispersion Liquid except that the particulate titanium dioxide (obtained from TAYCA CORPORATION, product name "JR-403", number average primary particle diameter: 250 nm, aspect ratio: 2, surface treatment: Al, Si) was changed to fusiform titanium dioxide (product name: ST-457SA, obtained from Titan Kogyo, Ltd., average crystallite diameter: 10 nm, aspect ratio: 5, surface treatment: aluminum hydroxide, stearic acid).

(Preparation Example 6 of Titanium Oxide Dispersion Liquid)

<Preparation of Titanium Oxide Dispersion Liquid 6>

[Titanium oxide dispersion liquid 6] (concentration of titanium dioxide particles: 20% by mass) was obtained in the same manner as in Preparation Example 1 of Titanium Oxide Dispersion Liquid except that the particulate titanium dioxide (obtained from TAYCA CORPORATION, product name "JR-403", number average primary particle diameter: 250 nm, aspect ratio: 2, surface treatment: Al, Si) was changed to fusiform titanium dioxide (product name: STV-455, obtained from Titan Kogyo, Ltd., average crystallite diameter: 15 nm, aspect ratio: 8, surface treatment: aluminum hydroxide, stearic acid).

(Silica Dispersion Liquids 1 to 3)

Silica dispersion liquids 1 to 3 used were the following commercially available products.

[Silica Dispersion Liquid 1] (obtained from Nissan Chemical Corporation, product name "ST-30", spherical, number average primary particle diameter: 12 nm, concentration of silica particles: 30% by mass)

[Silica Dispersion Liquid 2] (obtained from Nissan Chemical Corporation, product name "ST-30L", spherical, number average primary particle diameter: 45 nm, concentration of silica particles: 30% by mass)

[Silica Dispersion Liquid 3] (obtained from Nissan Chemical Corporation, product name "MP-1040", spherical, number average primary particle diameter: 100 nm, concentration of silica particles: 40% by mass)

TABLE 1

|  | Product name | Manufacturer | Kind | Surface treatment |
|---|---|---|---|---|
| First inorganic pigment dispersion liquid | Titanium oxide dispersion liquid 1 | JR-403 | TAYCA CORPORATION | Particulate titanium oxide | Al, Si |
| | Titanium oxide dispersion liquid 2 | JR-405 | TAYCA CORPORATION | Particulate titanium oxide | Al |
| | Titanium oxide dispersion liquid 3 | JR-603 | TAYCA CORPORATION | Particulate titanium oxide | Al, Zr |
| Second inorganic pigment dispersion liquid | Titanium oxide dispersion liquid 4 | ST-485SA15 | Titan Kogyo, Ltd. | Acicular titanium oxide | Al hydroxide, stearic acid |
| | Titanium oxide dispersion liquid 5 | ST-457SA | Titan Kogyo, Ltd. | Fusiform titanium oxide | Al hydroxide, stearic acid |
| | Titanium oxide dispersion liquid 6 | STV-455 | Titan Kogyo, Ltd. | Fusiform titanium oxide | Al hydroxide, stearic acid |
| | Silica dispersion liquid 1 | ST-30 | Nissan Chemical Corporation | Silica | — |
| | Silica dispersion liquid 2 | ST-30L | Nissan Chemical Corporation | Silica | — |
| | Silica dispersion liquid 3 | MP-1040 | Nissan Chemical Corporation | Silica | — |

Examples 1 to 13 and Comparative Examples 1 to 6

—Preparation of Inks—

Inks 1 to 19 were prepared from the materials in the amounts presented in Table 2 to Table 5 below by a routine method including filtration through a membrane filter having an average pore diameter of 5 μm (a cellulose acetate membrane). The amount of the resin particles in each of the inks is a value converted to the solid content.

TABLE 2

| | Examples | | | | | |
|---|---|---|---|---|---|---|
| | 1 Ink 1 | 2 Ink 2 | 3 Ink 3 | 4 Ink 4 | 5 Ink 5 | 6 Ink 6 |
| First inorganic pigment dispersion liquid | TiO₂ dispersion liquid 1 40 | TiO₂ dispersion liquid 1 40 | TiO₂ dispersion liquid 1 40 | TiO₂ dispersion liquid 1 40 | TiO₂ dispersion liquid 1 40 | TiO₂ dispersion liquid 1 40 |
| Second inorganic pigment dispersion liquid | Si dispersion liquid 1 6.7 | Si dispersion liquid 2 6.7 | Si dispersion liquid 3 5 | TiO₂ dispersion liquid 4 2.5 | TiO₂ dispersion liquid 4 5 | TiO₂ dispersion liquid 4 10 |
| Saccharide or hydrophilic layered clay mineral | | | | | | |
| Organic solvent  1,2-Propanediol | 18 | 14 | 18 | 16 | 18 | 16 |
|                  1,2-Butanediol | | 8 | 8 | 8 | 6 | 8 |

TABLE 2-continued

|  |  | Examples | | | | | |
| --- | --- | --- | --- | --- | --- | --- | --- |
|  |  | 1<br>Ink 1 | 2<br>Ink 2 | 3<br>Ink 3 | 4<br>Ink 4 | 5<br>Ink 5 | 6<br>Ink 6 |
|  | 1,5-Pentanediol | 6 |  |  |  |  |  |
|  | 1,6-Hexanediol |  | 2 | 2 | 4 |  | 4 |
|  | 3-Methoxy-3-methyl-1-butanol | 4 |  |  |  | 3 |  |
|  | 3-Methyl-1,3-butanediol |  |  |  |  | 3 |  |
|  | Diethylene glycol monoethyl ether | 2 |  |  |  |  |  |
|  | Diethylene glycol monobutyl ether |  | 2 | 2 | 4 |  | 4 |
|  | Amide compound represented by General Formula (1) |  |  | 2 |  | 2 |  |
| Resin particles | Polyester urethane resin 1 of Preparation Example 1 | 4 | 4 | 4 |  |  |  |
|  | Polyester urethane resin 2 of Preparation Example 2 |  |  |  | 4 | 4 |  |
|  | Polycarbonate urethane resin 1 of Preparation Example 3 |  |  |  |  |  | 4 |
|  | Acrylic resin of Preparation Example 4 |  |  |  |  |  |  |
| Surfactant | Fluorosurfactant | 0.1 |  | 0.1 |  | 0.1 | 0.1 |
|  | Silicone-based surfactant |  | 0.1 |  | 0.1 |  |  |
| Defoaming agent | AD01 | 0.5 | 0.5 | 0.5 | 0.5 | 0.5 | 0.5 |
| Preservative and fungicide | PROXEL LV | 0.05 | 0.05 | 0.05 | 0.05 | 0.05 | 0.05 |
| pH regulator | 1N—NaOH | 0.5 | 0.5 | 0.5 | 0.5 | 0.5 | 0.5 |
| Water | Ion-exchanged water | 64.85 | 66.85 | 64.85 | 60.85 | 64.85 | 62.85 |
|  | Total (% by mass) | 100 | 100 | 100 | 100 | 100 | 100 |

TABLE 3

|  |  | Examples | | | | | |
| --- | --- | --- | --- | --- | --- | --- | --- |
|  |  | 7<br>Ink 7 | 8<br>Ink 8 | 9<br>Ink 9 | 10<br>Ink 10 | 11<br>Ink 11 | 12<br>Ink 12 |
| First inorganic pigment dispersion liquid |  | TiO$_2$ dispersion liquid 1<br>40 | TiO$_2$ dispersion liquid 1<br>30 | TiO$_2$ dispersion liquid 1<br>40 | TiO$_2$ dispersion liquid 2<br>40 | TiO$_2$ dispersion liquid 2<br>40 | TiO$_2$ dispersion liquid 3<br>40 |
| Second inorganic pigment dispersion liquid |  | TiO$_2$ dispersion liquid 4<br>10 | TiO$_2$ dispersion liquid 5<br>10 | TiO$_2$ dispersion liquid 6<br>8 | TiO$_2$ dispersion liquid 6<br>8 | TiO$_2$ dispersion liquid 4<br>10 | TiO$_2$ dispersion liquid 5<br>4 |
| Saccharide or hydrophilic layered clay mineral |  |  |  |  |  |  |  |
| Organic solvent | 1,2-Propanediol | 16 | 16 | 16 | 18 | 16 | 14 |
|  | 1,2-Butanediol | 6 | 8 |  | 6 |  | 8 |
|  | 1,5-Pentanediol |  |  | 6 |  | 8 |  |
|  | 1,6-Hexanediol | 4 | 4 |  |  |  |  |
|  | 3-Methoxy-3-methyl-1-butanol |  |  | 3 | 3 | 4 |  |
|  | 3-Methyl-1,3-butanediol |  |  |  | 3 |  |  |
|  | Diethylene glycol monoethyl ether |  |  | 3 |  | 2 |  |
|  | Diethylene glycol monobutyl ether | 4 | 4 |  |  |  | 4 |
|  | Amide compound represented by General Formula (1) |  | 2 |  |  |  |  |

TABLE 3-continued

|  |  | Examples | | | | | |
| --- | --- | --- | --- | --- | --- | --- | --- |
|  |  | 7<br>Ink 7 | 8<br>Ink 8 | 9<br>Ink 9 | 10<br>Ink 10 | 11<br>Ink 11 | 12<br>Ink 12 |
| Resin particles | Polyester urethane resin 1 of Preparation Example 1 |  |  |  |  |  | 4 |
|  | Polyester urethane resin 2 of Preparation Example 2 |  |  |  |  |  |  |
|  | Polycarbonate urethane resin 1 of Preparation Example 3 | 4 | 4 |  |  |  |  |
|  | Acrylic resin of Preparation Example 4 |  |  | 4 | 4 | 4 |  |
| Surfactant | Fluorosurfactant | 0.1 | 0.1 |  |  | 0.1 | 0.1 |
|  | Silicone-based surfactant |  |  | 0.1 | 0.1 |  |  |
| Defoaming agent | AD01 | 0.5 | 0.5 | 0.5 | 0.5 | 0.5 | 0.5 |
| Preservative and fungicide | PROXEL LV | 0.05 | 0.05 | 0.05 | 0.05 | 0.05 | 0.05 |
| pH regulator | 1N—NaOH | 0.5 | 0.5 | 0.5 | 0.5 | 0.5 | 0.5 |
| Water | Ion-exchanged water | 64.85 | 60.85 | 66.85 | 64.85 | 64.85 | 64.85 |
| Total (% by mass) |  | 100 | 100 | 100 | 100 | 100 | 100 |

TABLE 4

|  |  | Example 13<br>Ink 13 |
| --- | --- | --- |
| First inorganic pigment dispersion liquid |  | TiO$_2$ dispersion liquid 3<br>40 |
| Second inorganic pigment dispersion liquid |  | TiO$_2$ dispersion liquid 6<br>12.5 |
| Saccharide or hydrophilic layered clay mineral |  |  |
| Organic solvent | 1,2-Propanediol | 20 |
|  | 1,2-Butanediol |  |
|  | 1,5-Pentanediol | 4 |
|  | 1,6-Hexanediol |  |
|  | 3-Methoxy-3-methyl-1-butanol | 2 |
|  | 3-Methyl-1,3-butanediol |  |
|  | Diethylene glycol monoethyl ether | 2 |
|  | Diethylene glycol monobutyl ether |  |
|  | Amide compound represented by General Formula (1) |  |
| Resin particles | Polyester urethane resin 1 of Preparation Example 1 | 4 |
|  | Polyester urethane resin 2 of Preparation Example 2 |  |
|  | Polycarbonate urethane resin 1 of Preparation Example 3 |  |
|  | Acrylic resin of Preparation Example 4 |  |
| Surfactant | Fluorosurfactant | 0.1 |
|  | Silicone-based surfactant |  |
| Defoaming agent | AD01 | 0.5 |
| Preservative and fungicide | PROXEL LV | 0.05 |
| pH regulator | 1N-NaOH | 0.5 |
| Water | Ion-exchanged water | 66.85 |
| Total (% by mass) |  | 100 |

TABLE 5

|  |  | Comparative Examples | | | | | |
| --- | --- | --- | --- | --- | --- | --- | --- |
|  |  | 1<br>Ink 14 | 2<br>Ink 15 | 3<br>Ink 16 | 4<br>Ink 17 | 5<br>Ink 18 | 6<br>Ink 19 |
| First inorganic pigment dispersion liquid |  | TiO$_2$ dispersion liquid 1<br>40 | TiO$_2$ dispersion liquid 2<br>40 | TiO$_2$ dispersion liquid 1<br>40 | TiO$_2$ dispersion liquid 1<br>40 |  | TiO$_2$ dispersion liquid 1<br>40 |
| Second inorganic pigment dispersion liquid |  |  |  |  |  | TiO$_2$ dispersion liquid 5<br>40 | TiO$_2$ dispersion liquid 5<br>40 |

TABLE 5-continued

| | | Comparative Examples | | | | | |
|---|---|---|---|---|---|---|---|
| | | 1<br>Ink 14 | 2<br>Ink 15 | 3<br>Ink 16 | 4<br>Ink 17 | 5<br>Ink 18 | 6<br>Ink 19 |
| Saccharide or hydrophilic layered clay mineral | | | | Saccharide 7 | Clay mineral 1 | | |
| Organic solvent | 1,2-Propanediol | 20 | 16 | 16 | 22 | 16 | 24 |
| | 1,2-Butanediol | | 10 | | | 8 | 10 |
| | 1,5-Pentanediol | 6 | | 6 | 4 | | |
| | 1,6-Hexanediol | | 4 | | | 4 | 4 |
| | 3-Methoxy-3-methyl-1-butanol | 1 | | 3 | 2 | | |
| | 3-Methyl-1,3-butanediol | | | | | 3 | |
| | Diethylene glycol monoethyl ether | 1 | | 3 | 2 | | |
| | Diethylene glycol monobutyl ether | | 4 | | | 4 | 4 |
| | Amide compound represented by General Formula (1) | | | | | 2 | 2 |
| Resin particles | Polyester urethane resin 1 of Preparation Example 1 | 4 | | | | | |
| | Polyester urethane resin 2 of Preparation Example 2 | | | | | | |
| | Polycarbonate urethane resin 1 of Preparation Example 3 | | 4 | | | 4 | |
| | Acrylic resin of Preparation Example 4 | | | 4 | 4 | | |
| Surfactant | Fluorosurfactant | 0.1 | 0.1 | 0.1 | 0.1 | 0.1 | 0.1 |
| | Silicone-based surfactant | | | | | | |
| Defoaming agent | AD01 | 0.5 | 0.5 | 0.5 | 0.5 | 0.5 | 0.5 |
| Preservative and fungicide | PROXEL LV | 0.05 | 0.05 | 0.05 | 0.05 | 0.05 | 0.05 |
| pH regulator | 1N—NaOH | 0.5 | 0.5 | 0.5 | 0.5 | 0.5 | 0.5 |
| Water | Ion-exchanged water | 66.85 | 60.85 | 59.85 | 63.85 | 60.85 | 54.85 |
| Total (% by mass) | | 100 | 100 | 100 | 100 | 100 | 100 |

Details of the materials used in the inks of Table 2 and Table 5 are as follows.

—Organic Solvents—

1,2-Propandiol (boiling point: 188° C.)
1,2-Butanediol (boiling point: 195° C.)
1,5-Pentanediol (boiling point: 242° C.)
1,6-Hexanediol (boiling point: 223° C.)
3-Methoxy-3-methyl-1-butanol (boiling point: 174° C.)
3-Methyl-1,3-butanediol (boiling point: 204° C.)
Diethylene glycol monoethyl ether (boiling point: 196° C.)
Diethylene glycol monobutyl ether (boiling point: 230° C.)
Amide compound represented by General Formula (1): amide compound represented by Structural Formula (1) below (obtained from Idemitsu Kosan Co., Ltd., ECAMIDE M100, boiling point: 216° C.)

Structural Formula (1)

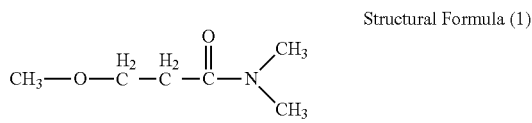

—Additives—

Fluorosurfactant (obtained from The Chemours Company, Capstone FS-34)

Silicone-based surfactant (obtained from BYK Chemie K.K., BYK-345)

Defoaming agent: ENVIROGEM AD01 (obtained from Air Products and Chemicals, Inc.)

Preservative and fungicide: PROXEL LV (obtained from Avecia, Co.)

pH regulator: 1N NaOH

—Saccharide—

The saccharide used in Ink 16 was glucose as a monosaccharide, maltose as a disaccharide, and maltotriose as a trisaccharide, and the proportions were 20% of the monosaccharide, 25% of the disaccharide, and 55% of the trisaccharide.

—Clay Mineral—

The clay mineral used in Ink 17 was LUCENTITE SWF (average particle diameter: 0.02 μm, aspect ratio: 1:250, obtained from Co-op Chemical Co., Ltd.).

Next, the properties of the inorganic pigments used in Examples 1 to 13 and Comparative Examples 1 to 6 are presented in Table 6-1 and Table 6-2 below.

TABLE 6-1

| | First inorganic pigment: A | | | | Second inorganic pigment: B | | | | | |
|---|---|---|---|---|---|---|---|---|---|---|
| | Product No. | Number avg. primary particle diameter (nm) | Aspect ratio | Amount (% by mass) | Product No. | Type of particles | Avg. crystallite diameter (nm) | Aspect ratio | Number avg. primary particle diameter (nm) | Amount (% by mass) | Mass ratio (A/B) |
| Ex. 1 | JR-403 | 250 | 2 | 8.0 | ST-30 | Silica | — | — | 12 | 2.0 | 4.0 |
| Ex. 2 | JR-403 | 250 | 2 | 8.0 | ST-30L | Silica | — | — | 45 | 2.0 | 4.0 |
| Ex. 3 | JR-403 | 250 | 2 | 8.0 | MP-1040 | Silica | — | — | 100 | 2.0 | 4.0 |
| Ex. 4 | JR-403 | 250 | 2 | 8.0 | ST-485SA15 | Acicular $TiO_2$ | 8 | 10 | — | 0.5 | 16.0 |
| Ex. 5 | JR-403 | 250 | 2 | 8.0 | ST-485SA15 | Acicular $TiO_2$ | 8 | 10 | — | 1.0 | 8.0 |
| Ex. 6 | JR-403 | 250 | 2 | 8.0 | ST-485SA15 | Acicular $TiO_2$ | 8 | 10 | — | 2.0 | 4.0 |
| Ex. 7 | JR-403 | 250 | 2 | 6.0 | ST-485SA15 | Acicular $TiO_2$ | 8 | 10 | — | 2.0 | 3.0 |
| Ex. 8 | JR-403 | 250 | 2 | 8.0 | ST-457SA | Fusiform $TiO_2$ | 10 | 5 | — | 2.0 | 4.0 |
| Ex. 9 | JR-403 | 250 | 2 | 8.0 | STV-455 | Fusiform $TiO_2$ | 15 | 8 | — | 1.6 | 5.0 |
| Ex. 10 | JR-405 | 210 | 2 | 8.0 | STV-455 | Fusiform $TiO_2$ | 15 | 8 | — | 1.6 | 5.0 |
| Ex. 11 | JR-405 | 210 | 2 | 8.0 | ST-485SA15 | Acicular $TiO_2$ | 8 | 10 | — | 2.0 | 4.0 |
| Ex. 12 | JR-603 | 300 | 3 | 8.0 | ST-457SA | Fusiform $TiO_2$ | 10 | 5 | — | 0.8 | 10.0 |
| Ex. 13 | JR-603 | 300 | 3 | 8.0 | STV-455 | Fusiform $TiO_2$ | 15 | 8 | — | 2.5 | 3.2 |

TABLE 6-2

| | First inorganic pigment: A | | | | Second inorganic pigment: B | | | | | |
|---|---|---|---|---|---|---|---|---|---|---|
| | Product No. | Number avg. primary particle diameter (nm) | Aspect ratio | Amount (% by mass) | Product No. | Type of particles | Avg. crystallite diameter (nm) | Aspect ratio | Number avg. primary particle diameter (nm) | Amount (% by mass) | Mass ratio (A/B) |
| Comp. Ex. 1 | JR-403 | 250 | 2 | 8.0 | — | — | — | — | — | — | — |
| Comp. Ex. 2 | JR-405 | 210 | 2 | 8.0 | — | — | — | — | — | — | — |
| Comp. Ex. 3 | JR-403 | 250 | 2 | 8.0 | Saccharide: 7% by mass (monosaccharide: 20%, disaccharide: 25%, trisaccharide: 55%) | | | | | | |
| Comp. Ex. 4 | JR-403 | 250 | 2 | 8.0 | Clay mineral: 1% by mass (smectite clay LUCENTITE SWF) | | | | | | |
| Comp. Ex. 5 | — | — | — | 0.0 | ST-457SA | Fusiform $TiO_2$ | 10 | 1:5 | — | 8.0 | 0.0 |
| Comp. Ex. 6 | JR-403 | 250 | 1:2 | 8.0 | ST-457SA | Fusiform $TiO_2$ | 10 | 1:5 | — | 2.0 | 4.0 |

<Printing Conditions>

A printing device for evaluation was provided using an inkjet printer (obtained from Ricoh Company, Ltd., IPSIO GXe5500). Specifically, the outer casing of the inkjet printer was removed, and a rear-surface multi manual feeder was attached thereto. For cleaning, pure water (wash liquid) was allowed to pass through an ink supply path including a printing head. A sufficient amount of the wash liquid was allowed to pass therethrough until the wash liquid was not colored. After that, the wash liquid was completely removed from the device.

Separately, each of the prepared inks was stirred for 30 minutes under a reduced pressure of from 5 Pa through 10 Pa to remove the gas from the ink for evaluation. The obtained ink was charged into an ink cartridge to provide an ink cartridge for evaluation.

The ink cartridge was operated to charge the ink to confirm that the ink for evaluation was charged into all the nozzles and no abnormal image was formed. After "Gloss Paper & Fine" mode had been selected with a driver in the printer, the printing mode used was set to color matching off in user settings. The discharge amount was adjusted by changing the drive voltage of the head so that the ink deposition amount would be 15 g/m² on a print medium as a solid image in this printing mode.

<Evaluation of Covering Performance>
—Evaluation of Brightness of Image—

Each of the inks used in Examples 1 to 13 and Comparative Examples 1 to 6 was charged into the above inkjet printer (obtained from Ricoh Company, Ltd., IPSIO GXe5500). A PET film attached via double-sided tape onto a sheet of MY PAPER (obtained from Ricoh Company, Ltd., PPC plain paper) was printed with a 50 cm×50 cm solid image prepared with MICROSOFT WORD 2003 (obtained from Microsoft Corporation), followed by drying at 80° C. for 5 minutes.

With a commercially available black paper sheet laid under this printed PET film, the printed portion was measured for brightness (L*) using an X-rite densitometer (X-Rite 939, obtained from X-Rite Inc.). Determination was made according to the following criteria, with A and B acceptable. For reference, the L* value measured with a non-printed PET film laid on the black sheet was 28. Results are presented in Table 7.

[Evaluation Criteria]
A: L* value was 65 or higher.
B: L* value was 60 or higher but lower than 65.
C: L* value was lower than 60.

<Evaluation of Alcohol Resistance>

A solid image obtained using each of the inks used in Examples 1 to 13 and Comparative Examples 1 to 6 was rubbed ten times with a black cotton swab immersed in an ethanol solution. Determination was made according to the following criteria, with A and B acceptable. Results are presented in Table 7.

[Evaluation Criteria]
- A: Even when the solid image was rubbed with the cotton swab immersed in a 40% ethanol solution, the cotton swab was not colored.
- B: When the solid image was rubbed with the cotton swab immersed in a 40% ethanol solution, the cotton swab was colored, whereas even when the solid image was rubbed with the cotton swab immersed in a 30% ethanol solution, the cotton swab was not colored.
- C: When the solid image was rubbed with the cotton swab immersed in a 30% ethanol solution, the cotton swab was colored, whereas even when the solid image was rubbed with the cotton swab immersed in a 20% ethanol solution, the cotton swab was not colored.
- D: When the solid image was rubbed with the cotton swab immersed in a 20% ethanol solution, the cotton swab was colored.

<Evaluation of Re-Dispersibility>

Each (80 mL) of the inks used in Examples 1 to 13 and Comparative Examples 1 to 6 was placed into a 100 mL screw tube bottle, which was then hermetically sealed. The bottle was left to stand still for 30 days at room temperature (25° C.) and humidity (RH) of 50%. The bottle was shaken upward and downward over a distance of 30 cm ten times as the up-down reciprocal motion, and 3 mL of the ink supernatant in the screw tube bottle was fractionated.

Each (1 g) of the above obtained fraction samples of Examples 1 to 13 and Comparative Examples 1 to 6 was 5,000-fold diluted with ion-exchange water. Next, a spectrophotometer (obtained from Shimadzu Corporation, UV-3100) was used to measure absorbance at a wavelength of 500 nm for each of the diluted inks. The obtained absorbance of the ink was compared with the absorbance of the corresponding ink immediately after the above preparation to calculate a recovery rate of absorbance from Formula (1) below. The recovery rate was evaluated according to the following criteria, with A, B, and B' acceptable. Results are presented in Table 7.

Recovery rate of absorbance (%)=100×(absorbance after being left to stand still)/(absorbance immediately after the preparation)    (1)

[Evaluation Criteria]
- A: Recovery rate was 90% or higher.
- B: Recovery rate was 85% or higher but lower than 90%.
- B': Recovery rate was 80% or higher but lower than 85%.
- C: Recovery rate was 70% or higher but lower than 80%.
- D: Recovery rate was lower than 70%.

<Evaluation of Storage Stability>

Each of the inks used in Examples 1 to 13 and Comparative Examples 1 to 6 was placed in a hermetic container and left to stand still in a thermostat vessel of 70° C. for 2 weeks. A change in viscosity between before and after storage was obtained from the following formula to evaluate storage stability of the ink. Determination was made according to the following criteria, with A and B acceptable.

Specifically, a cone-plate rotary viscometer (device name: VISCOMETER TV-22, obtained from TOKI SANGYO CO., LTD.) was used to measure the viscosities before and after storage under the following conditions: the temperature of thermostat circulating water: 25° C.; the number of rotation: 50 rpm; and the shear rate: 191.4 sec-1. Results are presented in Table 7.

$$\text{Change in viscosity (\%)} = \frac{\text{Viscosity of ink after storage} - \text{Viscosity of ink before storage}}{\text{Viscosity of ink before storage}} \times 100$$

[Evaluation Criteria]
- A: Change in viscosity was within ±5%.
- B: Change in viscosity was outside ±5% but within 10%.
- C: Change in viscosity was outside ±10%.

<Evaluation of Discharge Stability>

Each of the inks used in Examples 1 to 13 and Comparative Examples 1 to 6 was charged into an ink discharging device (device name: RICOH PRO L4160, obtained from Ricoh Company, Ltd.). With the capping of the head removed, the ink was left to stand still for 1 hour at 25° C. and relative humidity of 15%. A solid image was formed with one pass and no interlace using all the channels of the heads, with the main-scanning direction being 170 mm and the sub-scanning direction being the nozzle channel width. Presence or absence of non-discharge and turbulent jetting were visually observed to evaluate discharge stability, with A, B, and B' acceptable. Results are presented in Table 7.

[Evaluation Criteria]
- A: Neither non-discharge nor turbulent jetting was observed.
- B: Non-discharge was not observed, but turbulent jetting was slightly observed to form white streaks and black streaks.
- B': Non-discharge was observed in 10 channels or less of the nozzles, which was however acceptable.
- C: Non-discharge was observed in 10 channels or more of the nozzles.

TABLE 7

| | Covering performance (whiteness) | Alcohol resistance | Re-dispersibility | Storage stability | Discharge stability |
|---|---|---|---|---|---|
| Ex. 1 | B | A | B' | B | B |
| Ex. 2 | B | A | B' | B | B |
| Ex. 3 | B | A | B' | B | B |
| Ex. 4 | A | A | B | B | B |
| Ex. 5 | A | A | A | B | B |
| Ex. 6 | A | A | A | B | B' |
| Ex. 7 | B | A | B | B | B |
| Ex. 8 | A | A | A | A | B |
| Ex. 9 | A | A | A | A | A |
| Ex. 10 | B | A | A | A | A |
| Ex. 11 | B | A | A | B | B' |
| Ex. 12 | A | A | B | A | B |
| Ex. 13 | A | A | B | A | B' |
| Comp. Ex. 1 | A | A | D | B | B |
| Comp. Ex. 2 | B | A | D | B | A |
| Comp. Ex. 3 | B | D | C | C | B' |
| Comp. Ex. 4 | B | B | C | C | C |
| Comp. Ex. 5 | C | A | B' | B | C |
| Comp. Ex. 6 | B | D | B | B | B |

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. An ink, comprising:
   water;
   an organic solvent;
   resin particles;
   a first inorganic pigment; and
   a second inorganic pigment,
   wherein the first inorganic pigment comprises particulate titanium oxide, and the second inorganic pigment comprises at least one selected from the group consisting of acicular titanium oxide and fusiform titanium oxide,
   wherein a mass ratio of an amount of the first inorganic pigment to an amount of the second inorganic pigment is 4 or more but 10 or less,
   wherein the particulate titanium oxide has an aspect ratio of lower than 5,
   wherein the fusiform titanium oxide has an aspect ratio of 5 or higher but lower than 10,
   wherein the acicular titanium oxide has an aspect ratio of 10 or higher, and
   wherein the aspect ratio is a ratio of an average major axis length to an average minor axis length.

2. The ink according to claim 1, wherein the particulate titanium oxide has an aspect ratio of 1 or higher but 3 or lower.

3. The ink according to claim 1, wherein the second inorganic pigment comprises silica particles.

4. The ink according to claim 3, wherein the silica particles have a number average primary particle diameter of 20 nm or more but 100 nm or less.

5. The ink according to claim 1, wherein the resin particles comprise at least one selected from the group consisting of acrylic resin particles and polyurethane resin particles.

6. The ink according to claim 1, wherein the organic solvent comprises a water-soluble organic solvent, and the water-soluble organic solvent comprises at least one selected from the group consisting of amide compounds represented by General Formula (1) below, alkanediols, and glycol ethers:

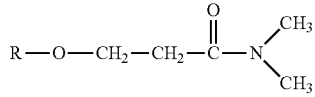

General Formula (1)

where in the General Formula (1), R represents a straight chain or branched alkyl group having from t through 6 carbon atoms.

7. An image forming method, comprising:
   applying a stimulus to the ink according to claim 1 to allow the ink to fly, to print an image.

8. An image forming apparatus, comprising:
   an ink container containing the ink according to claim 1; and
   an ink flying unit configured to allow the ink to fly to print an image.

9. A printed matter, comprising:
   a print medium; and
   a printed layer on the print medium,
   wherein the printed layer comprises a resin, a first inorganic pigment, and a second inorganic pigment,
   the first inorganic pigment comprises particulate titanium oxide, and the second inorganic pigment comprises at least one selected from the group consisting of acicular titanium oxide and fusiform titanium oxide,
   wherein a mass ratio of an amount of the first inorganic pigment to an amount of the second inorganic pigment is 4 or more but 10 or less,
   wherein the particulate titanium oxide has an aspect ratio of lower than 5,
   wherein the fusiform titanium oxide has an aspect ratio of 5 or higher but lower than 10,
   wherein the acicular titanium oxide has an aspect ratio of 10 or higher, and
   wherein the aspect ratio is a ratio of an average major axis length to an average minor axis length.

10. The ink according to claim 1, wherein the second inorganic pigment comprises the acicular titanium oxide.

11. The ink according to claim 1, wherein the second inorganic pigment comprises the fusiform titanium oxide.

* * * * *